(12) United States Patent
Wu et al.

(10) Patent No.: US 9,361,725 B2
(45) Date of Patent: Jun. 7, 2016

(54) IMAGE GENERATION APPARATUS, IMAGE DISPLAY APPARATUS, IMAGE GENERATION METHOD AND NON-TRANSITORY COMPUTER READABLE MEDIUM

(71) Applicant: NLT Technologies, Ltd., Kawasaki, Kanagawa (JP)

(72) Inventors: Di Wu, Kawasaki (JP); Michiaki Sakamoto, Kawasaki (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 410 days.

(21) Appl. No.: 13/866,548

(22) Filed: Apr. 19, 2013

(65) Prior Publication Data

US 2013/0278596 A1  Oct. 24, 2013

(30) Foreign Application Priority Data

Apr. 20, 2012  (JP) .................................. 2012-096311

(51) Int. Cl.
  *G06T 15/00*  (2011.01)
  *H04N 13/00*  (2006.01)
  *H04N 13/02*  (2006.01)

(52) U.S. Cl.
  CPC ............ *G06T 15/00* (2013.01); *H04N 13/0011* (2013.01); *H04N 13/0271* (2013.01)

(58) Field of Classification Search
  CPC ..................................................... G06T 15/00
  See application file for complete search history.

(56) References Cited

U.S. PATENT DOCUMENTS 6,611,632 B1 *  8/2003  Tomiyama et al. ............ 382/300
2001/0021034 A1 *  9/2001  Suzuki et al. .................. 358/1.9

(Continued)

FOREIGN PATENT DOCUMENTS

JP  2001-175863 A  6/2001
JP  2001-256482 A  9/2001

(Continued)

OTHER PUBLICATIONS

Ilsoon Lim et al, "Depth Super-resolution for Enhanced Free-viewpoint TV", SID Symposium Digest of Technical Papers, May 2010, vol. 41, Issue 1, pp. 1268-1271.
Communication dated Nov. 24, 2015 from the Japanese Patent Office issued in corresponding Application No. 2012-096311.

*Primary Examiner* — Jefferey Harold
*Assistant Examiner* — Justin Sanders
(74) *Attorney, Agent, or Firm* — Sughrue Mion, PLLC

(57) ABSTRACT

Provided are an image generation apparatus, three-dimensional image display apparatus, image generation method and non-transitory computer readable medium. An image generation apparatus for generating a virtual-viewpoint image, includes a disparity-image-generating section which generates a disparity image corresponding to a two-dimensional image, by using a depth image and a parameter of a virtual camera; a disparity-image-correcting section which corrects the disparity image based on contour lines extracted from the two-dimensional image and the disparity image, or corrects the depth image to be used for generating the disparity image based on contour lines extracted from the two-dimensional image and the depth image; an pixel-shift-processing section which shifts each pixel of the two-dimensional image according to the corrected disparity image, to generate an intermediate image; and a unfixed-pixel-area-interpolating section which interpolates unfixed pixels to which the shifted pixels have been assigned in the intermediate image, to generate the virtual-viewpoint image.

14 Claims, 15 Drawing Sheets

(56) References Cited

U.S. PATENT DOCUMENTS

2005/0063582 A1* 3/2005 Park et al. .................. 382/154
2011/0080464 A1 4/2011 Alessandrini et al.
2014/0293028 A1* 10/2014 Nguyen et al. ............... 348/59

FOREIGN PATENT DOCUMENTS

| JP | 2005-228134 A | 8/2005 |
|---|---|---|
| JP | 2011-525769 A | 9/2011 |
| WO | 2010087751 A1 | 8/2010 |

* cited by examiner

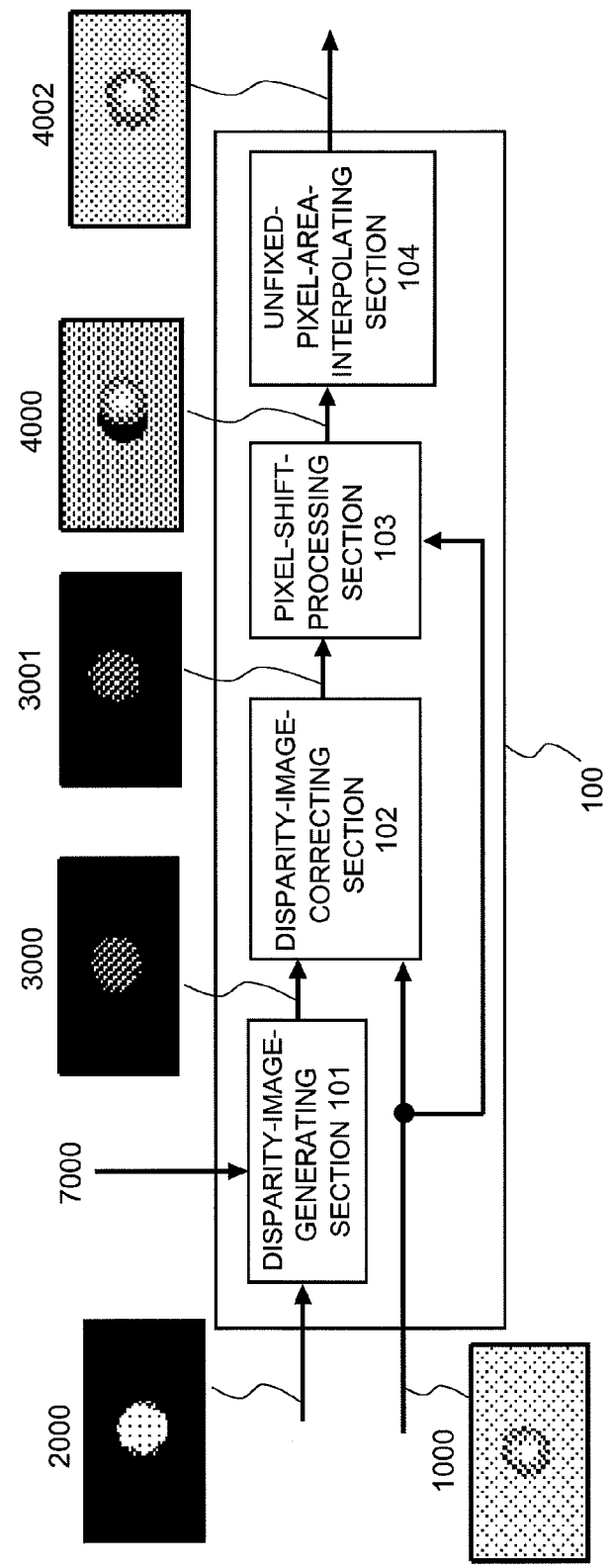

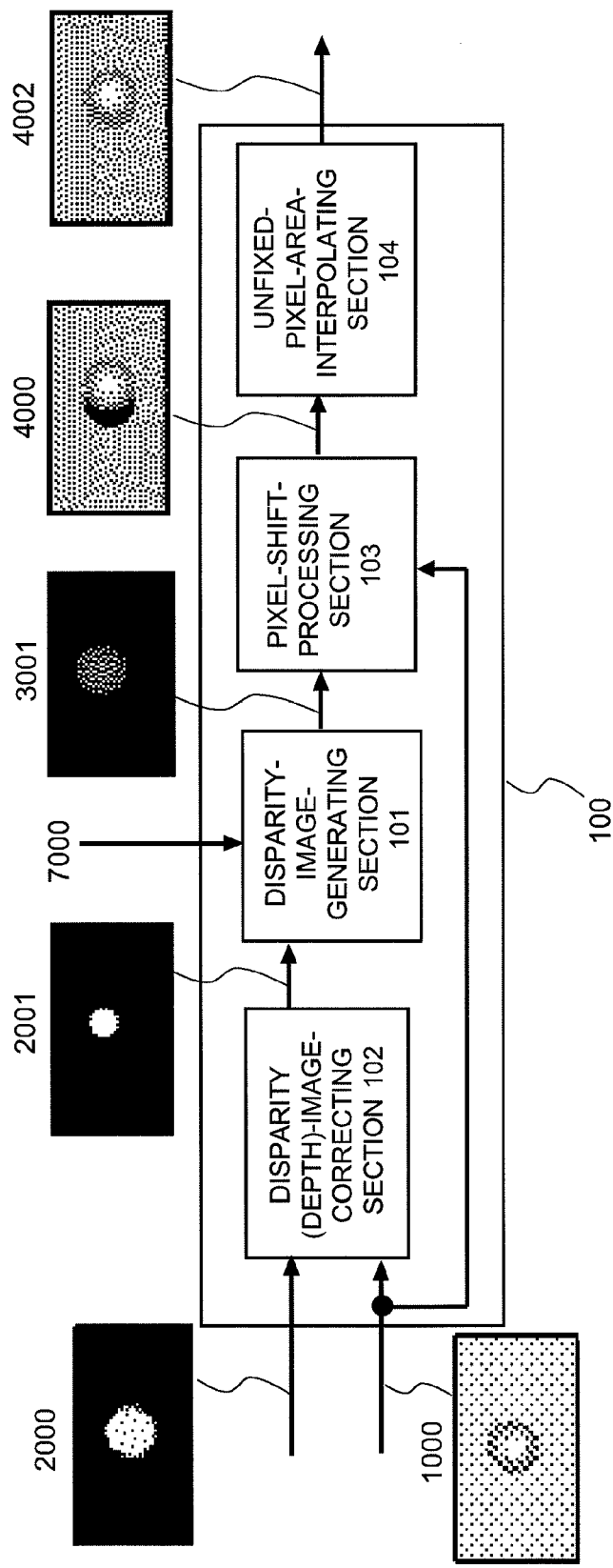

FIG. 5A
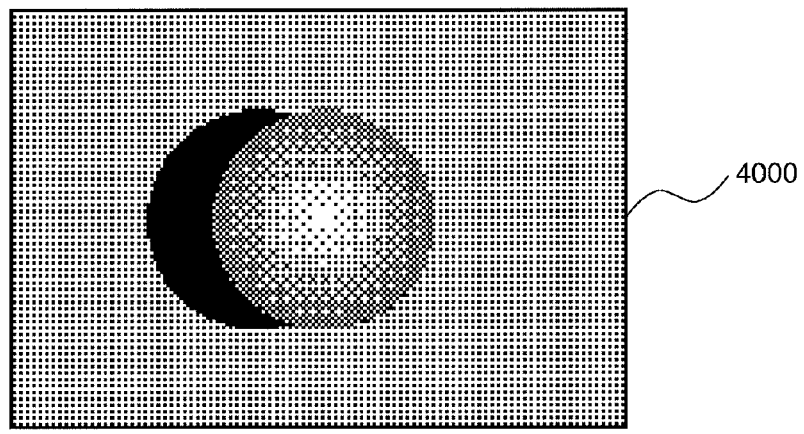
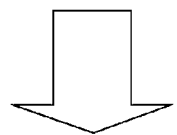
FIG. 5B
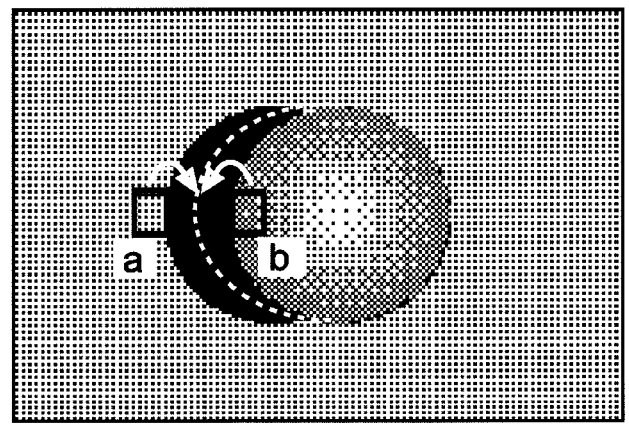
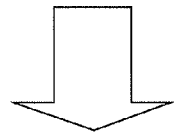
FIG. 5C
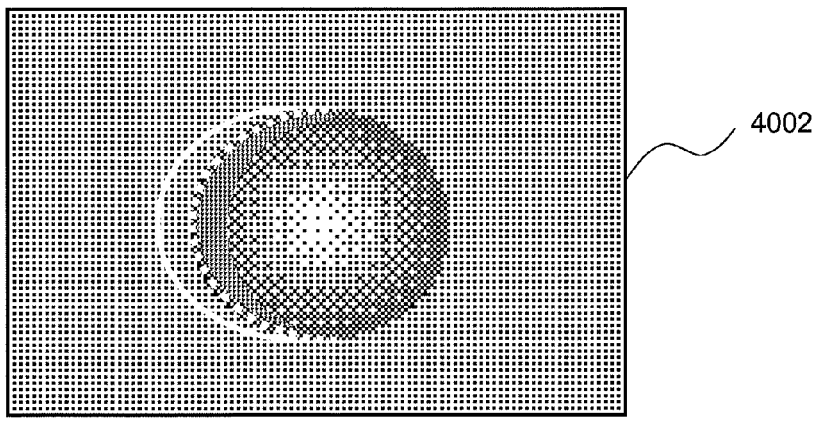

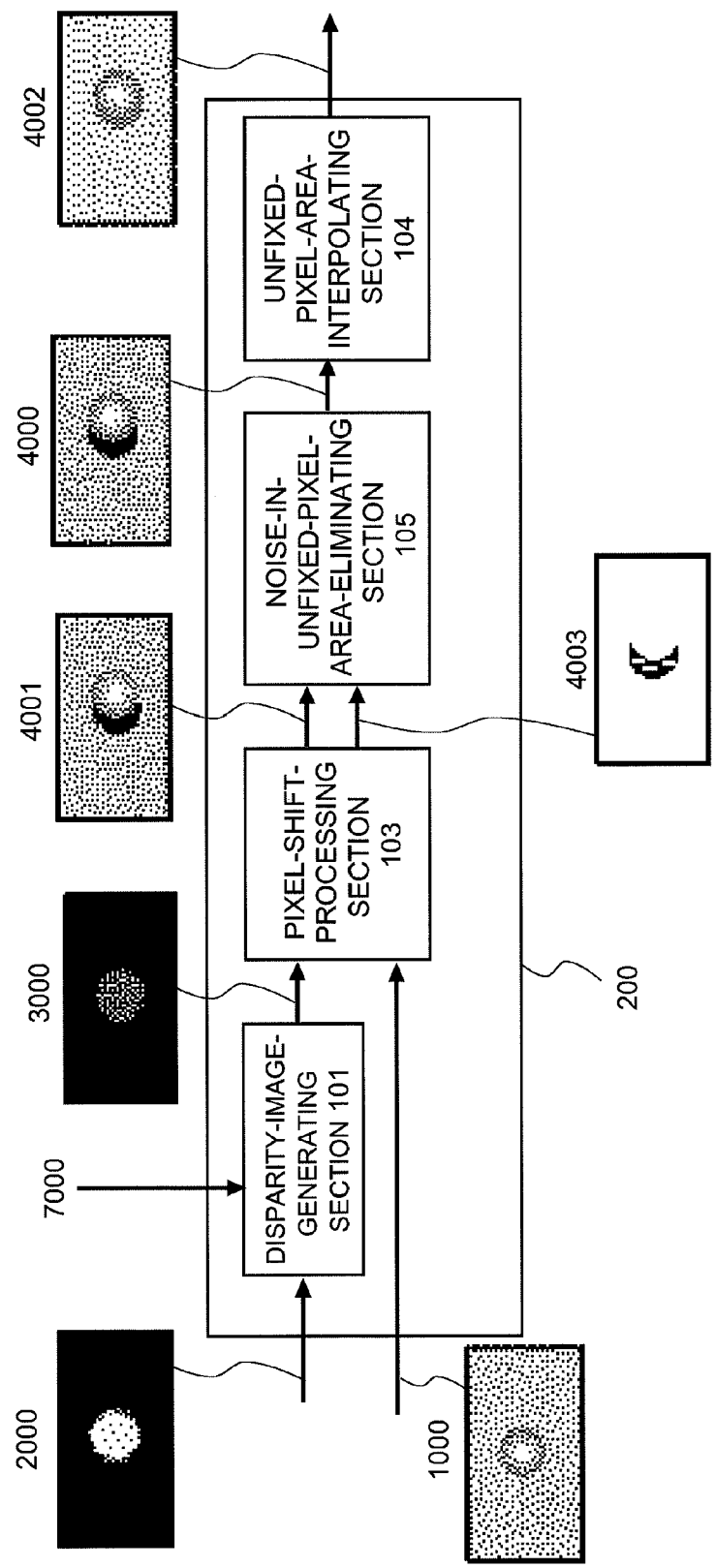

TWO-DIMENSIONAL-IMAGE SIGNAL

DISPARITY-IMAGE SIGNAL

AREA OF UNFIXED PIXELS

INTERMEDIATE-IMAGE SIGNAL

TWO-DIMENSIONAL-IMAGE SIGNAL

DISPARITY-IMAGE SIGNAL

AREA OF UNFIXED PIXELS

INTERMEDIATE-IMAGE SIGNAL

IMAGE GENERATION APPARATUS, IMAGE DISPLAY APPARATUS, IMAGE GENERATION METHOD AND NON-TRANSITORY COMPUTER READABLE MEDIUM

CROSS REFERENCE TO RELATED APPLICATIONS

This application is based on Japanese Patent Application No. 2012-096311 filed on Apr. 20, 2012, in the Japan Patent Office, the entire content of which is hereby incorporated by reference.

TECHNICAL FIELD

The present invention relates to an image generation apparatus, image display apparatus, image generation method and non-transitory computer readable medium storing an image generation program. Especially, the present invention relates to an image generation apparatus, image display apparatus, image generation method and non-transitory computer readable medium storing an image generation program, each provided for generating or displaying a stereoscopic image based on signal of a two-dimensional image and signal of a disparity image.

BACKGROUND

Recently, technologies of creating 3D display contents are attracting increased attention, corresponding to an advance of technologies of 3D image display apparatuses. When a 3D image display apparatus receives image signal through a transmission line and performs 3D display, image signal corresponding to each viewpoint is required to be transmitted to the apparatus. Especially, a multi-viewpoint stereoscopic image requires several times as much data for an image display terminal as a normal two-dimensional image. Therefore, a reduction of the amount of image data to be transmitted is one of research topics in the field of creating 3D display contents.

Based on the above background, a technology to use signal of one of two-dimensional images for realizing 3D display and signal of a depth image representing depth information of a three-dimensional object for each pixel of the two-dimensional image to generate the other of the two-dimensional images, is being studied. The other of the two-dimensional images is generated through an image processing technology using parameters of a virtual camera. Therefore, it will be referred as a virtual-viewpoint image hereafter. The use of the method to generate a virtual-viewpoint image by using signal of a two-dimensional image and signal of a depth image corresponding to the two-dimensional image through an image conversion process, has allowed an image display terminal to perform 3D display based on a reduced amount of transmitted image data.

However, it is not easy to prepare a depth image which is so accurate as to precisely reflect per-pixel depth information of signal of a two-dimensional image. When a depth image is captured by using an actual stereo camera, the resolution of the depth image is limited by inherent properties of the stereo camera, to be lower than that of signal of a two-dimensional image. For example, a depth image which has been captured with a TOF (Time of Flight) camera developed by Mesa Imaging AG (Swiss Ranger SR3100, where "Swiss Ranger" is a trademark) has the resolution of 176×144 pixels, which is far more from the resolution of signal of a two-dimensional image. Further, many 3D-CG tools sacrifice the resolution of a depth image in favor of increasing their rendering speed. In the situation that a depth image is estimated from signal of plural two-dimensional images corresponding to various viewpoints, the given depth-image signal becomes less accurate because of the influence of misditecting the corresponding pixels between the two-dimensional images. The deteriorated accuracy of the depth-image signal makes a problem that noise in the generated virtual-viewpoint image becomes inconspicuous and the image quality is deteriorated.

To solve such the problem in deterioration of image quality, for example, Japanese Unexamined Patent Application Publication (JP-A) No. 2001-175863 discloses the following apparatus: the apparatus includes a distance-information-detecting section which detects distance information from information of plural images, a smoothing section which smoothes the detected distance information with a weighting process so as to minimize a weight function defined by a curved surface given based on the distance information, a weight-information-detecting section which detects weight information required to perform weighting in the smoothing process by using an index representing the likelihood of values of the detected distance information, and an image-representing-and-interpolating section which shifts each pixel of an inputted viewpoint image based on the smoothed distance information and obtains an interpolated image at an arbitrary viewpoint.

Further, JP-A No. 2005-228134 discloses the method to extract corresponding feature points from both of a planar-image information of a three-dimensional-image data and a planar-image information of a two-dimensional-image data, to correct a displacement of an object in the three-dimensional-image data by modifying a closed geometry enclosed by plural feature points based on a correspondence of the extracted feature points, and to generate a virtual-viewpoint-image data by using depth information of the corrected three-dimensional-image data and the planar-image information of the two-dimensional-image data.

Further, Ilsoon Lim, Hocheon Wey, Dusik Park, "Depth Super-resolution for Enhanced Free-viewpoint TV", SID Symposium Digest of Technical Papers May 2010 Volume 41, Issue 1, pp. 1268-1271, discloses the method to convert low-resolution depth-image signal into high-resolution image signal by using contour-line information of depth-image signal.

As described above, when a virtual-viewpoint image is generated by using signal of one of two-dimensional images for realizing 3D display and signal of a depth image representing per-pixel depth information of an object corresponding to the signal of two-dimensional image, deteriorated accuracy of the signal of the depth image makes noise of the generated virtual-viewpoint image inconspicuous, which deteriorates the image quality.

To solve the problem, JP-A No. 2001-175863 proposes the method to reduce errors in the signal of the depth image, which has been generated from signal of plural two-dimensional images, by using a weighting process and a smoothing process, to enhance a deteriorated image quality of an image at an interpolated viewpoint. However, this method is hardly correct errors in signal of the depth image completely. Especially, in the signal of the depth image corrected by a smoothing process, a peripheral area of a contour line of each object is obscure and does not represent the difference in depth between objects clearly. Therefore, in the signal of a virtual-viewpoint image generated based on this signal, pixels corresponding to the contour area of each object are scattered, which makes noise around the contour area inconspicuous.

Further, JP-A No. 2005-228134 proposes the method to extract feature points from both of a planar-image information of a three-dimensional-image data and a planar-image information of a two-dimensional-image data. However, this method provides feature-point extraction from depth information with low accuracy under the situation that depth information (signal of depth image) and of two-dimensional-image data are inputted in place of three-dimensional-image data and the two-dimensional-image data, because there are no color information and texture information. Therefore, accurate correspondence of the feature points is hardy obtained.

Further, Ilsoon Lim, Hocheon Wey, Dusik Park, "Depth Super-resolution for Enhanced Free-viewpoint TV", SID Symposium Digest of Technical Papers May 2010 Volume 41, Issue 1, pp. 1268-1271, proposes the method to use just contour information of signal of a depth image, in order to obtain a virtual-viewpoint image. However, when the accuracy of the depth image is deteriorated, the contour information of the depth image originally includes errors and this method can provide a corrected depth image with much lower accuracy.

SUMMARY

There are disclosed illustrative image generation apparatuses, image display apparatuses, image generation methods and a non-transitory computer readable medium storing an image generation program, as embodiments of the present invention.

The present invention has been achieved in view of the above problems, and one object of the invention is to provide an image display apparatuses, image generation methods and a non-transitory computer readable medium storing an image generation program each of which can generate a virtual-viewpoint image with less noise and high image quality when signal of a virtual-viewpoint image is generated from signal of a two-dimensional image and signal of a depth image corresponding to the two-dimensional image.

An illustrative image generation apparatus as a first embodiment reflecting one aspect of the present invention is an image generation apparatus which uses a two-dimensional image, a depth image representing depth information of the two-dimensional image, and a parameter of a virtual camera arranged at a virtual location in a three-dimensional space, to generate a virtual-viewpoint image to be captured with the virtual camera at the virtual location. The image generation apparatus comprises a disparity-image-generating section which generates a disparity image representing a disparity value of each pixel of the two-dimensional image, by using the depth image and the parameter of the virtual camera. The image generation apparatus further comprises a disparity-image-correcting section which performs one of correcting the disparity value of each of pixels of the disparity image generated by the disparity-image-generating section, based on a contour line extracted from the two-dimensional image and a contour line extracted from the disparity image, and correcting the depth information of each of pixels of the depth image to be used for generating the disparity image in the disparity-image-generating section, based on a contour line extracted from the two-dimensional image and a contour line extracted from the depth image. The image generation apparatus further comprises an pixel-shift-processing section which shifts each pixel of the two-dimensional image according to the disparity image given after one of the correcting the disparity values and the correcting the depth information, to generate an intermediate image; and a unfixed-pixel-area-interpolating section which interpolates unfixed pixels to which shifted pixels of the two-dimensional image have not been assigned in the intermediate image, to generate the virtual-viewpoint image.

An illustrative image generation apparatus as a second embodiment reflecting another aspect of the present invention is an image generation apparatus which uses a two-dimensional image, a depth image representing depth information of the two-dimensional image, and a parameter of a virtual camera arranged at a virtual location in a three-dimensional space, to generate a virtual-viewpoint image to be captured with the virtual camera at the virtual location. The image generation apparatus comprises: a disparity-image-generating section which generates a disparity image representing a disparity value of each pixel of the two-dimensional image, by using the depth image and the parameter of the virtual camera; and a pixel-shift-processing section which shifts each pixel of the two-dimensional image according to the disparity image, to generate an intermediate image. The image generation apparatus further comprises: a noise-in-unfixed-pixel-area-eliminating section which eliminates noise in an area of unfixed pixels to which shifted pixels of the two-dimensional image have not been assigned in the intermediate image; and a unfixed-pixel-area-interpolating section which interpolates the unfixed pixels in the intermediate image wherein the noise has been eliminated, to generate the virtual-viewpoint image.

An illustrative image generation apparatus as a third embodiment reflecting another aspect of the present invention is an image generation apparatus which uses a plurality of two-dimensional images to generate a virtual-viewpoint image to be captured with a virtual camera arranged at a virtual location in a three-dimensional space. The image generation apparatus comprises: a disparity-image-generating section which generates a disparity image representing a disparity value of each pixel of one of the plurality of two-dimensional image, by using the plurality of two-dimensional images; and a disparity-image-correcting section which corrects the disparity value of each of pixels of the disparity image generated by the disparity-image-generating section, based on a contour line extracted from the one of the plurality of two-dimensional images and a contour line extracted from the disparity image. The image generation apparatus further comprises: a pixel-shift-processing section which shifts each pixel in the one of the plurality of two-dimensional images according to the disparity image which has been corrected, to generate an intermediate image; and a unfixed-pixel-area-interpolating section which interpolates unfixed pixels to which shifted pixels of the one of the two-dimensional image have not been assigned in the intermediate image, to generate the virtual-viewpoint image.

Another illustrative image generation apparatus as the third embodiment reflecting another aspect of the present invention is an image generation apparatus which uses a plurality of two-dimensional images to generate a virtual-viewpoint image to be captured with a virtual camera arranged at a virtual location in a three-dimensional space. The image generation apparatus comprises: a disparity-image-generating section which generates a disparity image representing a disparity value of each pixel of one of the plurality of two-dimensional image, by using the plurality of two-dimensional images; and a pixel-shift-processing section which shifts each pixel in the one of the plurality of two-dimensional images according to the disparity image, to generate an intermediate image. The image generation apparatus further comprises: a noise-in-unfixed-pixel-area-eliminating section which eliminates noise in an area of unfixed pixels to which shifted pixels of the one of the two-dimensional images have not been assigned in the intermediate image; and a unfixed-pixel-area-interpolating section which interpolates the unfixed pixels in the intermediate image wherein the noise has been eliminated, to generate the virtual-viewpoint image.

Those illustrative image generation apparatuses, image display apparatuses, image generation methods and a non-transitory computer readable medium storing an image generation program, can generate a virtual-viewpoint image with less noise and high image quality because of the following processing.

In the above illustrative embodiments, a disparity image is generated by using a depth image and a parameter of a virtual camera or by using plural two-dimensional images. Disparity value of each of pixels of the generated disparity image or depth information of each of pixels of the depth image to be used to generate the disparity image is corrected, where the disparity value is corrected based on a contour line extracted from the two-dimensional image and a contour line extracted from the disparity image, and the depth information is corrected based on a contour line extracted from the two-dimensional image and a contour line extracted from the depth image. Then, an intermediate image is generated by shifting each pixel of the two-dimensional image according to the disparity image given after the correction. Further, unfixed pixels in the intermediate image are interpolated to generate a virtual-viewpoint image.

In other illustrative embodiments, a disparity image is generated by using a depth image and a parameter of a virtual camera or by using plural two-dimensional images. An intermediate image is generated by shifting each pixel of the two-dimensional image according to the disparity image. Then, noise elimination is performed for noise generated in an area of unfixed pixels of the intermediate image, and the unfixed pixels in the intermediate image are interpolated to generate a virtual-viewpoint image.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

Each of FIGS. 1A and 1B is a block diagram illustrating a structure of an image generation apparatus relating to Embodiment 1;

FIGS. 5A to 5C show a sequence diagram illustrating an example of a method of interpolating unfixed pixels in the image generation apparatus relating to Example 1;

FIG. 6 is a block diagram illustrating a structure of an image generation apparatus relating to Embodiment 2;

Figure 7A:
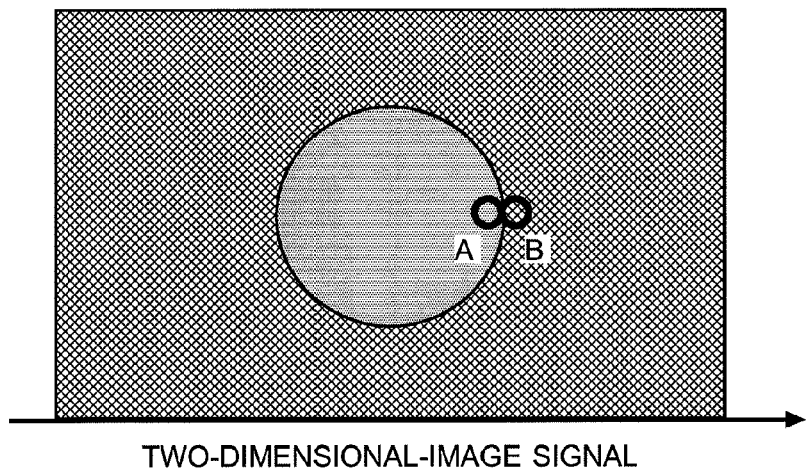
Figure 7B:
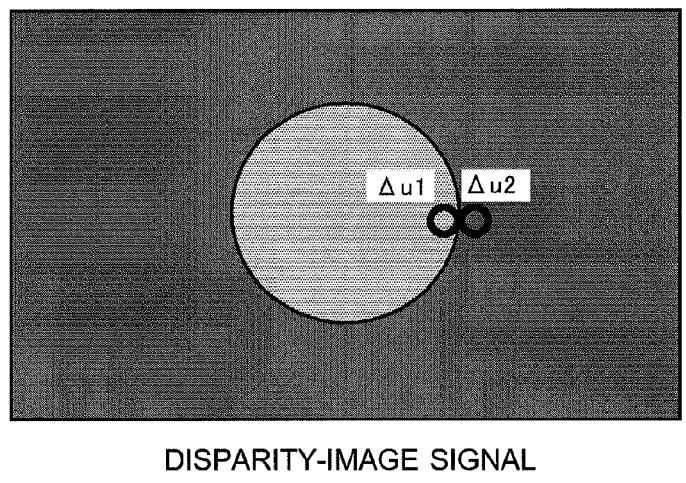
Figure 7C:
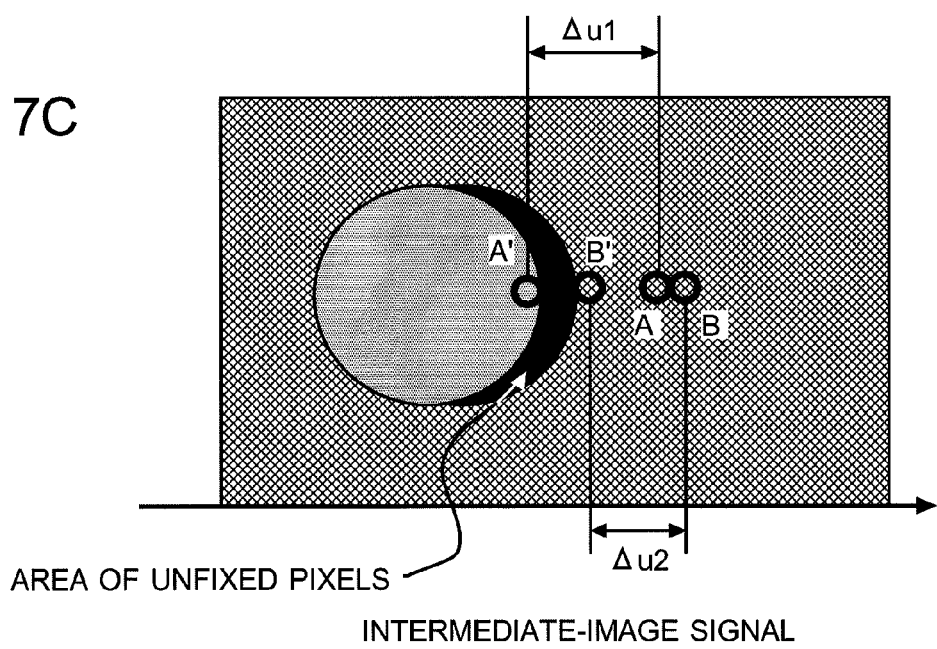
Figure 8A:
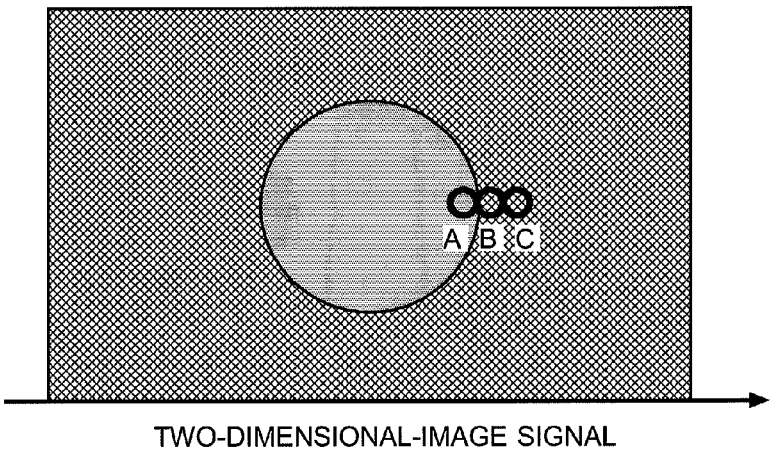
Figure 8B:
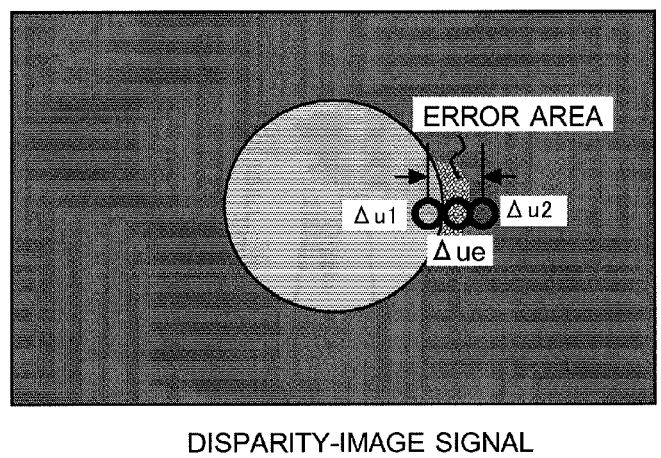
Figure 8C:
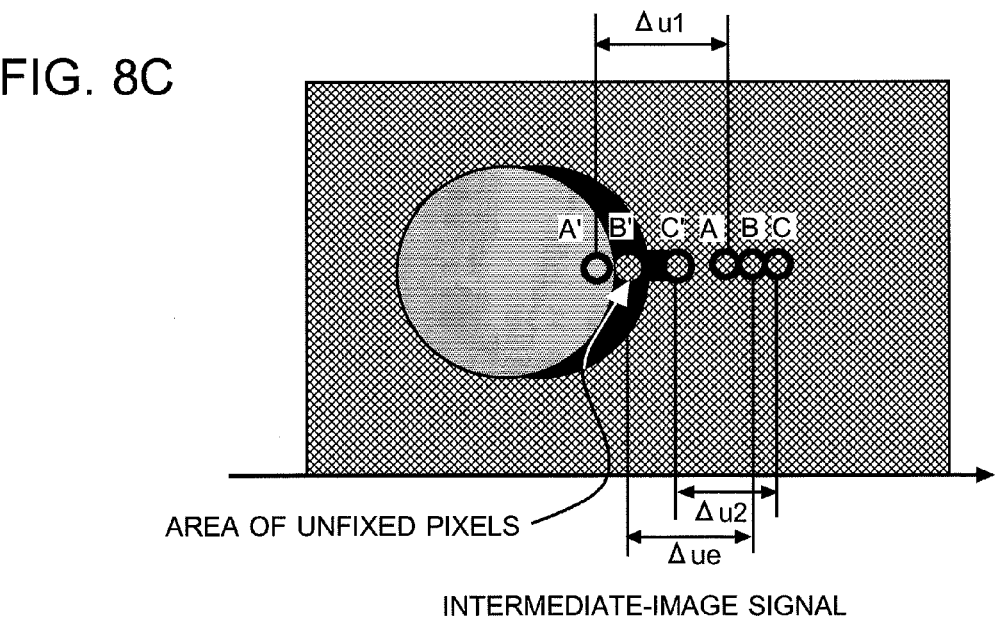
Figure 9:
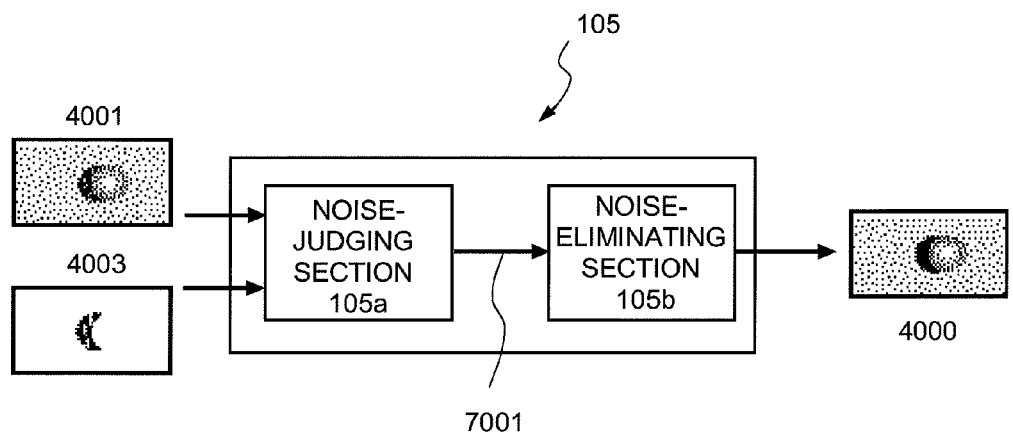
Figure 10A:
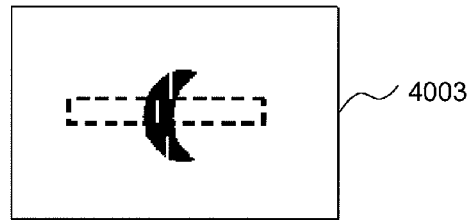
Figure 10B:
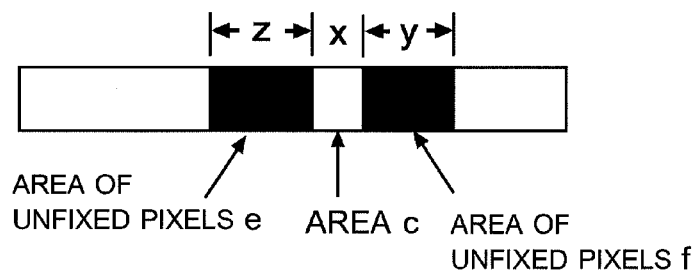
Figure 11:
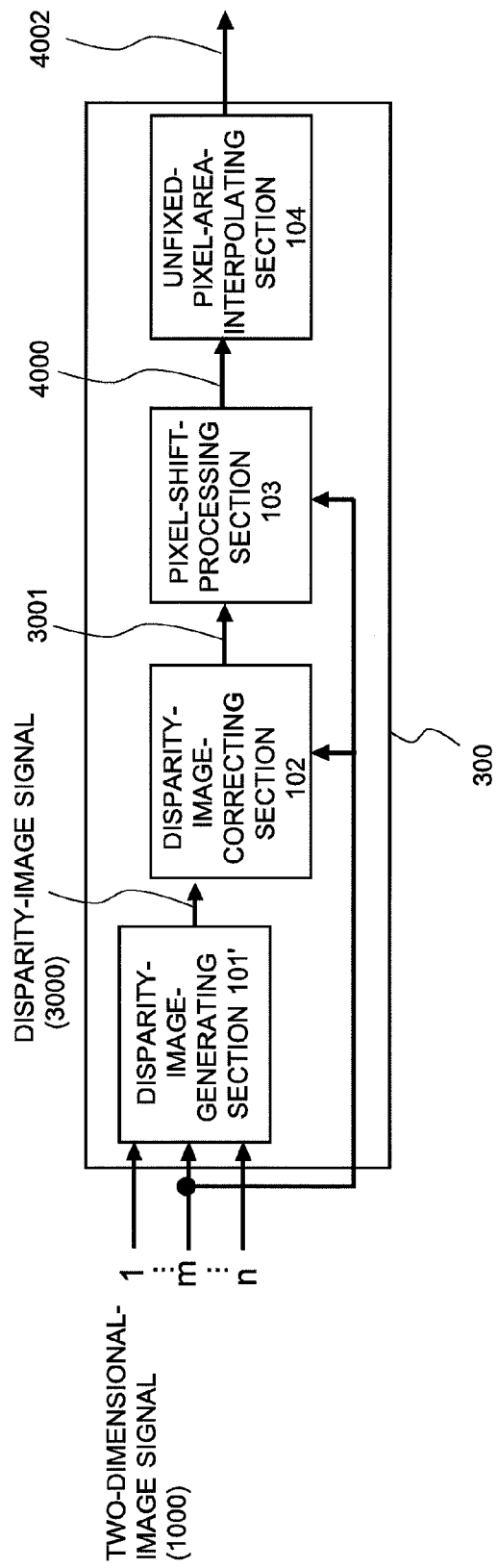
Figure 12:
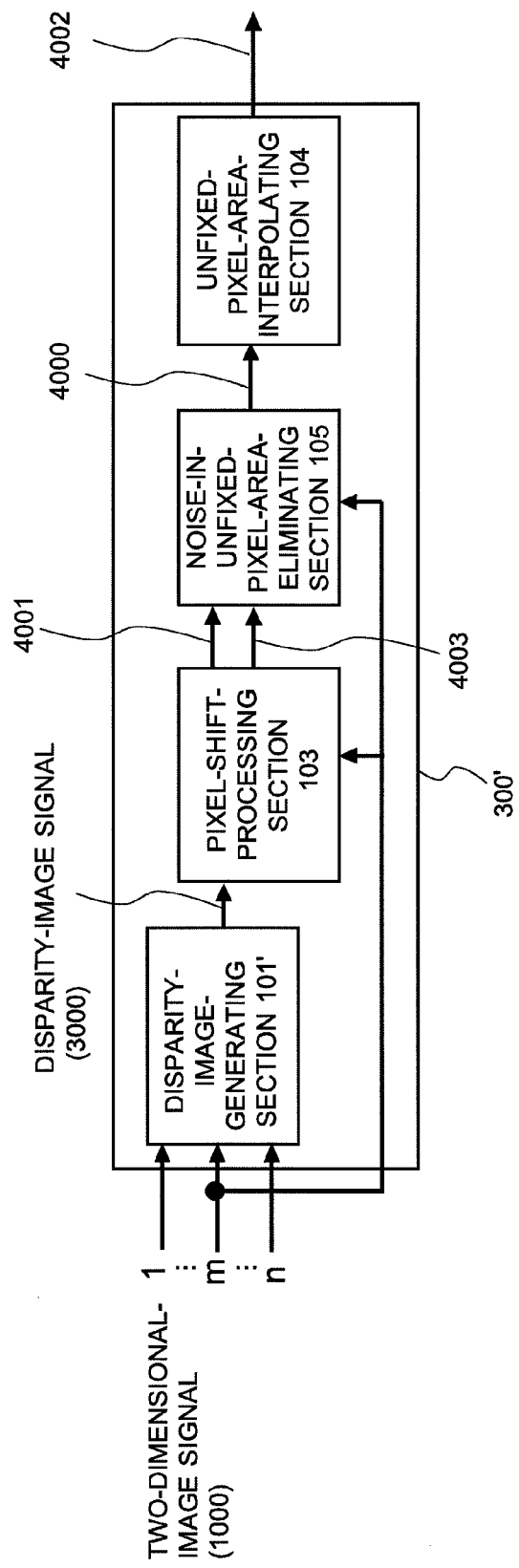
Figure 13A:
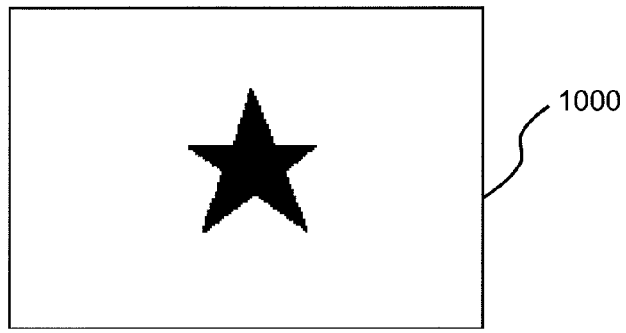
Figure 13B:
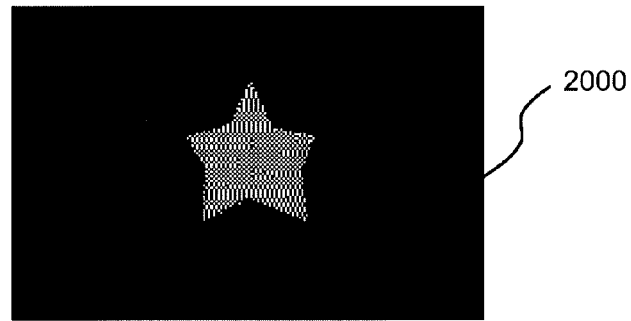
Figure 13C:
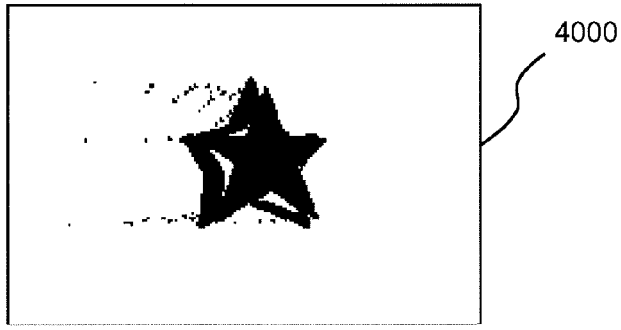
Figure 13D:
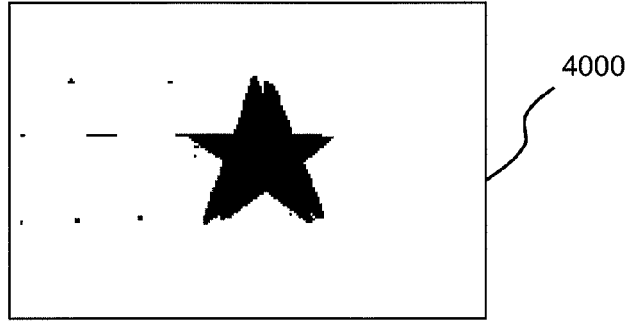
Figure 13E:
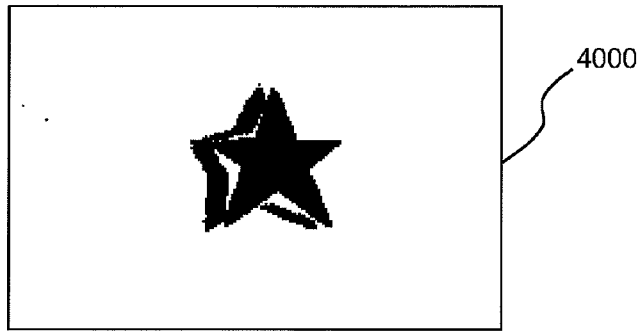
Figure 13F:
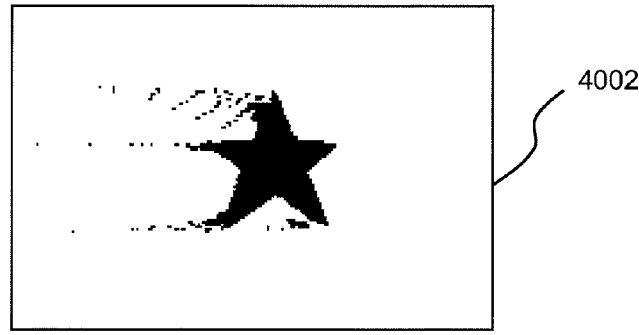
Figure 13G:
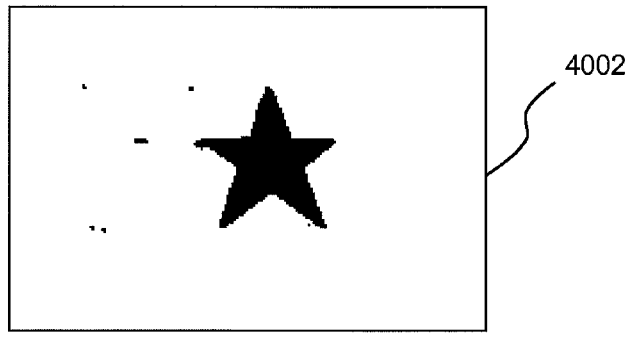
Figure 13H:
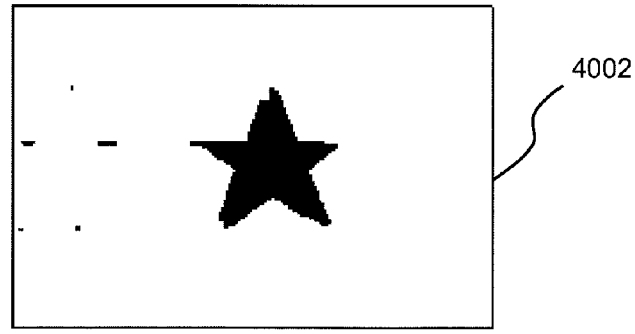
Figure 14:
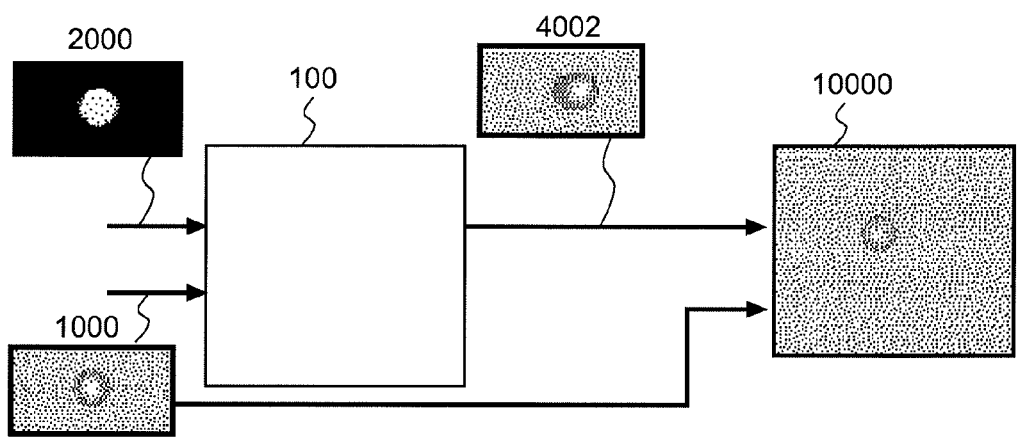

Each of FIGS. 7A to 7C is a diagram illustrating a cause of generation of an area of unfixed pixels;

Each of FIGS. 8A to 8C is a diagram illustrating a cause of generation of noise in the area of unfixed pixels;

FIG. 9 is a block diagram illustrating an example of a structure of a noise-in-unfixed-pixel-area-eliminating section in the image generation apparatus relating to Embodiment 2;

Each of FIGS. 10A and 10B is a block diagram illustrating a process of eliminating noise in the area of unfixed pixels in the image generation apparatus relating to Embodiment 2;

FIG. 11 is a block diagram illustrating a structure of an image generation apparatus relating to Embodiment 3;

FIG. 12 is a block diagram illustrating another structure of an image generation apparatus relating to Embodiment 3;

FIG. 13A shows a specific example of a result of outputting image data (a two-dimensional-image signal) for illustrating an effect of the present embodiment;

FIG. 13B shows a specific example of a result of outputting image data (a depth-image signal) for illustrating an effect of the present embodiments;

FIG. 13C shows a specific example of a result of outputting image data (an intermediate-image signal generated by a conventional method) for illustrating an effect of the present embodiments;

FIG. 13D shows a specific example of a result of outputting image data (an intermediate-image signal generated by the method of Embodiment 1) for illustrating an effect of the present embodiments;

FIG. 13E shows a specific example of a result of outputting image data (an intermediate-image signal generated by the method of Embodiment 2) for illustrating an effect of the present embodiments;

FIG. 13F shows a specific example of a result of outputting image data (a virtual-viewpoint-image signal generated by a conventional method) for illustrating an effect of the present embodiments;

FIG. 13G shows a specific example of a result of outputting image data (a virtual-viewpoint image signal generated by the method of Embodiment 1) for illustrating an effect of the present embodiments;

FIG. 13H shows a specific example of a result of outputting image data (a virtual-viewpoint image signal generated by the method of Embodiment 2) for illustrating an effect of the present embodiments; and FIG. 14 is a block diagram illustrating a structure of an image display apparatus including an image generation apparatus relating to the present embodiments.

DETAILED DESCRIPTION

Illustrative embodiments of image generation apparatuses, image display apparatuses, image generation methods and non-transitory computer readable media each storing an image generation program therein will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

Embodiment 1

A structure of an image generation apparatus for generating a virtual-viewpoint image, relating to Embodiment 1 will be described with reference to FIGS. 1A and 1B. Each of FIGS. 1A and 1B is a block diagram illustrating a structure of an image generation apparatus 100 relating to the present embodiment.

As shown in FIG. 1A, image generation apparatus 100 includes disparity-image-generating section 101, disparity-image-correcting section 102, pixel-shift-processing section 103, and unfixed-pixel-area-interpolating section 104. Image generation apparatus 100 uses virtual-camera parameter 7000, depth-image signal 2000 and two-dimensional-image signal 1000, to generate and output virtual-viewpoint-image signal 4002. Herein, two-dimensional-image signal 1000 is signal of an image captured with a camera at a viewpoint in a three-dimensional space. Virtual camera parameter 7000 is provided for defining a virtual camera which is assumed to be located in the same three-dimensional space as that of the viewpoint of the two-dimensional-image signal 1000 but is not placed in the space actually. The virtual-camera parameter 7000 includes a focal length, a field of view and coordinate information in the three-dimensional space of the virtual camera. Depth-image signal 2000 represents a distance between an object and the viewpoint in the three-dimensional space for each pixel of two-dimensional-image signal 1000. Virtual-viewpoint-image signal 4002 is signal of image captured from a virtual location of the virtual camera.

Functions of processing sections included in image generation apparatus 100 will be described below.

First, virtual-camera parameter 7000 and depth-image signal 2000 are inputted into disparity-image-generating section 101. The inputted depth-image signal 2000 usually has the same resolution as that of the two-dimensional-image signal 1000. However, under the situation that the inputted depth-image signal 2000 has been generated from a low-resolution original data through an interpolating process, the depth-image signal 2000 can provide information which does not reflect depth information for each pixel of two-dimensional-image signal 1000 accurately. For example, when the depth image has been generated by capturing an image with actual device, the resolution is limited by inherent properties of a stereo camera and the resolution does not come close to that of the two-dimensional-image signal. When a depth image has been generated by a 3D-CG tool such as Lightwave (trademark) and 3ds Max (trademark), the resolution of the depth image is sacrificed in favor of increasing a rendering speed in most cases. Further, when a depth image is estimated from signal of plural two-dimensional images corresponding to various viewpoints, the given depth image has more deteriorated accuracy because of an influence of an estimation error. To solve them, after receiving the depth-image signal 2000 with low accuracy and virtual-camera parameter 7000, disparity-image-generating section 101 converts depth-image signal 2000 into disparity-image signal 3000 representing a shift amount (a disparity value) for each pixel of the two-dimensional-image signal, in order to generate virtual-viewpoint-image signal 4002. The amount of disparity $\Delta u(u, v)$ of a pixel $(u, v)$ in two-dimensional image signal 1000 is given, for example, by the expression (1).

$$\Delta u(u, v) = \frac{IOD}{z(u, v)} \cdot \frac{1}{\tan(Fov/2)} \quad (1)$$

Herein, $z(u, v)$ is a value of a pixel $(u, v)$ of depth-image signal 2000, and represents a distance between an object and a viewpoint in the three-dimensional space, corresponding to a pixel $(u, v)$ of two-dimensional-image signal 1000. The symbol "IOD" represents the interval of a viewpoint corresponding to the two-dimensional-image signal 1000 as an input and a viewpoint corresponding to the virtual-viewpoint-image signal as an output. The symbol "Fov" represents a field of view of the camera. Disparity-image-generating section 101 outputs the generated disparity-image signal 3000.

Then, disparity-image signal 3000 and two-dimensional-image signal 1000 are inputted into disparity-image-correcting section 102. Disparity-image-correcting section 102 extracts a contour line of inputted two-dimensional-image signal 1000 and a contour line of inputted disparity-image signal 3000, and corrects a disparity value of each of pixels around the contour line of disparity-image signal 3000, to output corrected disparity-image signal 3001. A specific structure and a specific processing method of disparity-image-correcting section 102 will be described later.

Next, disparity-image signal 3001 after the correction and two-dimensional-image signal 1000 are inputted into pixel-shift-processing section 103. Pixel-shift-processing section 103 shifts each pixel of two-dimensional-image signal 1000 to a proper position according to the corrected disparity-image signal 3001, to generate intermediate-image signal 4000. Generally, pixel-shift-processing section 103 shifts color information of a pixel $(u, v)$ in two-dimensional-image signal 1000 to the position of the coordinates $(u+\Delta u(u, v), v)$ of intermediate-image signal 4000, where $\Delta u(u, v)$ is a value of a pixel $(u, v)$ of the corrected disparity-image signal 3001. For adjusting the projection amount and the depth amount of an object of a 3D content, color information of a pixel $(u, v)$ of the two-dimensional-image signal may be set to a pixel at the coordinates $(u+k \cdot \Delta u(u, v), v)$ of intermediate-image signal 4000, where k is a factor of adjusting a stereoscopic effect. The value of k may be defined as a constant value or may be calculated according to the function $k=f(u, v)$ with respect to the coordinates $(u, v)$. The intermediate-image signal 4000 is image signal obtained by shifting the two-dimensional-image signal per pixel according to the corrected disparity-image signal 3001. In the intermediate-image signal 4000, there are some pixels to which, at the stage of the coordinate calculation, none of coordinates of pixels of two-dimensional-image signal after the shift correspond and to which color is never fixed (in other words, some pixels to which the shifted pixels are not assigned). These pixels are defined as unfixed pixels.

Finally, intermediate-image signal 4000 is inputted into unfixed-pixel-area-interpolating section 104. The unfixed-pixel-area-interpolating section 104 interpolates unfixed pixels in intermediate-image signal 4000 by using a method such as a linear interpolation, an average-value interpolation, and a weight smoothing method. The interpolated image is outputted as virtual-viewpoint image 4002.

An example of the way to interpolate unfixed pixels will be described with reference to FIGS. 5A to 5C. FIG. 5A illustrates intermediate-image signal including unfixed pixels. FIG. 5B illustrates the way to interpolate unfixed pixels. First, an area of unfixed pixels is divided into two parts equally. The left part of the area of unfixed pixels divided by a white broken line is filled up with a value of the left neighboring pixel "a", and the right part of the area of unfixed pixels divided by a white broken line is filled up with a value of the right neighboring pixel "b". FIG. 5C illustrates virtual-viewpoint-image signal after the correction.

Figure 2:
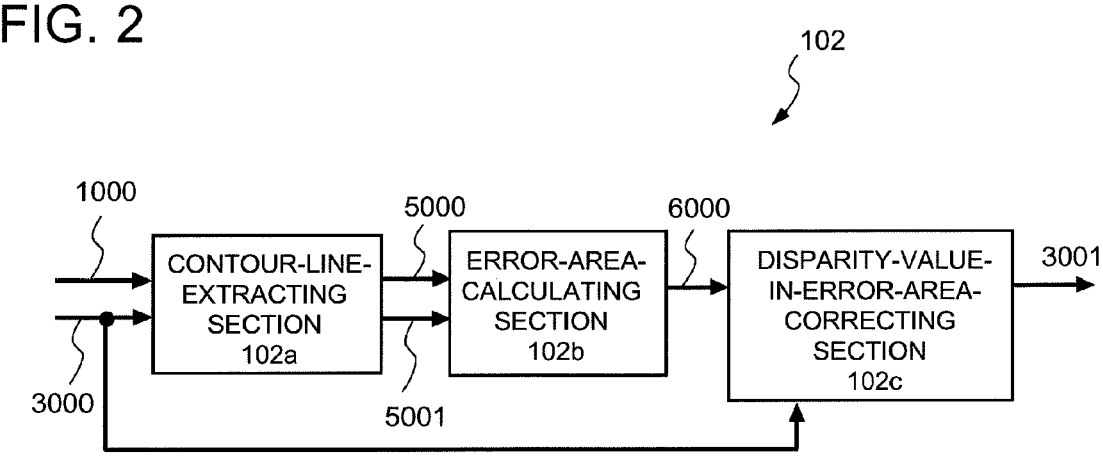
FIG. 2 is a block diagram illustrating an example of a structure of a disparity-image-correcting section in the image generation apparatus relating to Embodiment 1.

Next, a detailed structure of disparity-image-correcting section 102 in image generation apparatus 100 will be described. FIG. 2 is a block diagram illustrating an example of a structure of disparity-image-correcting section 102. As shown in FIG. 2, disparity-image-correcting section 102 includes contour-line-extracting section 102a, error-area-calculating section 102b and disparity-value-in-error-area-correcting section 102c.

Disparity-image signal 3000 with low accuracy and two-dimensional-image signal 1000 are inputted into contour-line-extracting section 102a. Contour-line-extracting section 102a performs contour-line extraction for two-dimensional-image signal 1000 and disparity-image signal 3000 by using a method such as a second-order differentiation, Sovel filter and Prewitt filter. The coordinate information of a contour line extracted from each image is defined as contour-line information of the two-dimensional image 5000 and contour-line information of the disparity image 5001. The contour-line information 5000 and contour-line information 5001 are inputted into error-area-calculating section 102b. The error-area-calculating section 102b estimates error-area information 6000 in the disparity image. The error-area information 6000 represents positional information of an area where there is a high possibility that the disparity value is wrong in disparity-image signal 3000. The given error-area information 6000 and disparity-image signal 3000 are inputted into disparity-value-in-error-area-correcting section 102c. The disparity-value-in-error-area-correcting section 102c refers error-area information 6000 and corrects a disparity value of each pixel in the error area.

Figure 3:
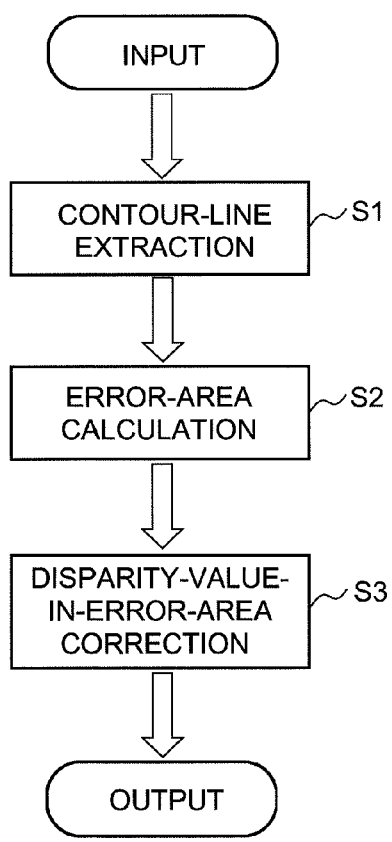
FIG. 3 is a sequence diagram illustrating an example of a method of correcting a disparity image performed in the image generation apparatus relating to Embodiment 1.

FIG. 3 is a flowchart illustrating the processing performed in disparity-image-correcting section 102. In the present embodiment, three steps of "a contour-line extraction", "an error-area calculation" and "a disparity-value-in-error-area correction" in order to correct the disparity amounts in the error area in disparity-image signal 3000. Hereinafter, concrete processing of each step will be described with reference to FIGS. 4A to 4H.

Figure 4A:
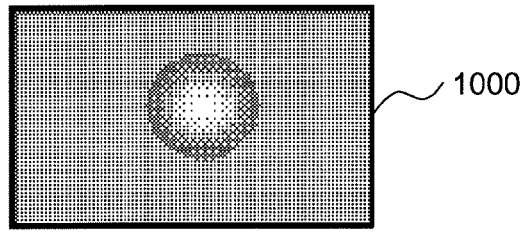
FIG. 4A illustrates an example of a result of outputting image (two-dimensional-image signal) in the process of correcting a disparity image.
Figure 4B:
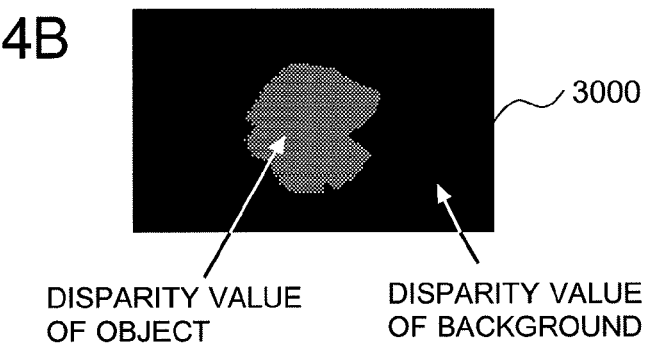
FIG. 4B illustrates an example of a result of outputting image (disparity-image signal) in the process of correcting a disparity image.
Figure 4C:
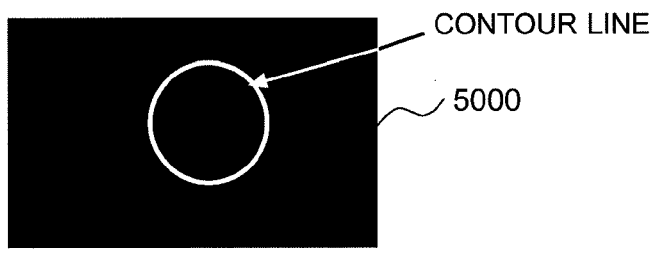
FIG. 4C illustrates an example of a result of outputting image (contour information of two-dimensional image) in the process of correcting a disparity image.
Figure 4D:
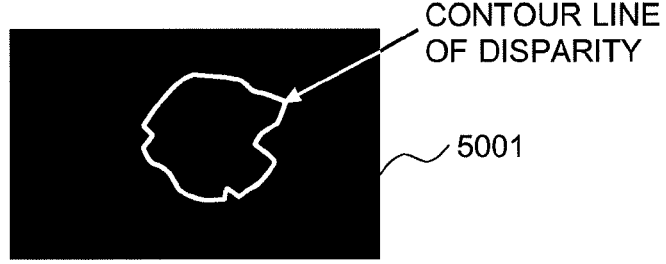
FIG. 4D illustrates an example of a result of outputting image (contour information of disparity image) in the process of correcting a disparity image.

Step 1: The contour-line extraction is performed for two-dimensional-image signal 1000 and disparity-image signal 3000 with low accuracy so as to extract a contour line of two-dimensional-image signal 1000 and a contour line of disparity-image signal 3000 through a method such as a second-order differentiation, Sovel filter and Prewitt filter, and to output contour-line information of two-dimensional image 5000 and contour-line information of disparity image 5001. As for an example shown in FIGS. 4A to 4H, FIG. 4A shows two-dimensional-image signal 1000 as an input, and FIG. 4B shows disparity-image signal 3000 with low accuracy. FIG. 4C shows an image obtained after the contour-line extraction performed for the image of FIG. 4A and FIG. 4D shows an image obtained after the contour-line extraction performed for the image of FIG. 4B.

Step 2: The error-area calculation is processing to calculate error-area information 6000 in disparity-image signal 3000 by using contour information of the two-dimensional-image signal 5000 and contour information of the disparity-image signal 5001. Error-area information 6000 represents positional information of an area where there is a high possibility that the disparity value is wrong in disparity-image signal 3000.

Herein, concrete operations for calculating error-area information 6000 at the j-th row in disparity-image signal 3000 are described. First, contour information of the two-dimensional-image signal 5000 and contour information of the disparity-image signal 5001 within the area ω ranging from the (j−a)-th row to the (j+a)-th row are obtained (FIG. 4E).

Figure 4E:
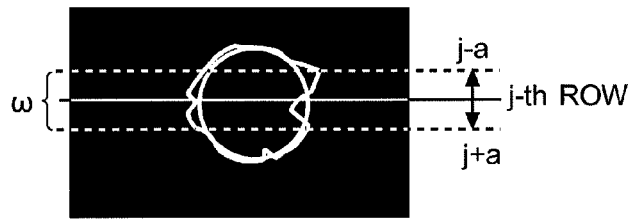
FIG. 4E illustrates an example of a result of outputting image (contour information of both of a two-dimensional image and a disparity image within the area ω ranging from the (j−a)-th row to the (j+a)-th row) in the process of correcting a disparity image.
Figure 4F:
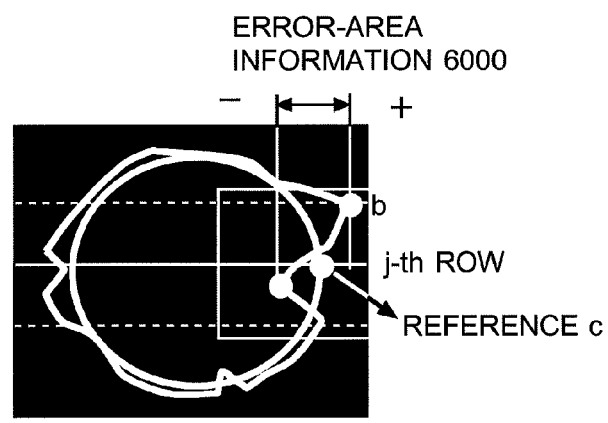
FIG. 4F illustrates an example of a result of outputting image (the enlarged view of FIG. 4E) in the process of correcting a disparity image.

FIG. 4F is an enlarged view of a contour area of FIG. 4E. Defining pixel c on the contour at the j-th row shown in contour information of the two-dimensional image 5000 as a reference pixel, pixels a and b on the contour in contour information of the disparity image 5001 are determined, where the pixel b is a pixel on the contour, separated from the reference pixel in the +x direction at the maximum distance within the vicinity area ω of the reference pixel, and the pixel a is a pixel on the contour, separated from the reference pixel in the −x direction within the vicinity area ω of the reference pixel. Further, an area located between the pixels a and b is judged as an error area. Information representing the position of the error area is outputted as error-area information 6000.

As for the vicinity area, the reason why the region for searching the error area is defined to cover the pixel at the farthest position from the reference pixel not only in the same row but also in the vicinity area ω including the neighboring rows, is that the calculation and correction performed per each row can cause row-dependent noise. Widening the searching region as above can prevent occurrence of row-dependent noise.

Figure 4G:
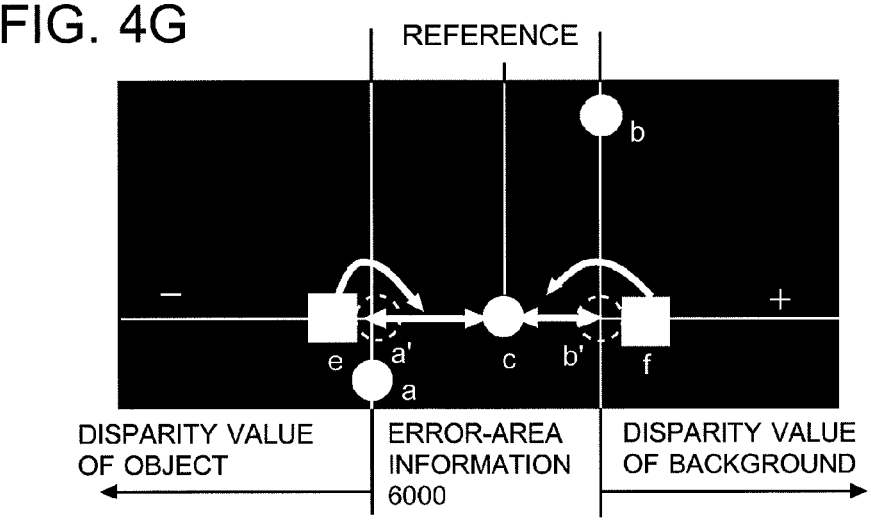
FIG. 4G illustrates an example of a result of outputting image (the enlarged view of FIG. 4F) in the process of correcting a disparity image.
Figure 4H:
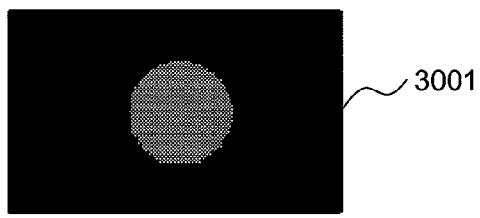
FIG. 4H illustrates an example of a result of outputting image (a disparity-image signal after the correction) in the process of correcting a disparity image.

Step S3: The disparity-value-in-error-area correction is processing to correct the disparity value in the error area. FIG. 4G is an enlarged view of the part enclosed by the white rectangular line in FIG. 4F, and shows an example of the way to correct disparity.

At the j-th row, the disparity value of each of pixels from the reference pixel c to pixel b' having the same abscissa as the pixel b is corrected by using the value of the neighboring pixel f of the pixel b'. Further, the disparity value of each pixels from the reference pixel c to pixel a' having the same abscissa as the pixel a is corrected by using the value of the neighboring pixel e of the pixel a'. After the same disparity correction is performed sequentially from the first row to the end row, the corrected disparity-image signal 3001 (FIG. 4H) is outputted.

Though the above example describes the case that extraction of the error area and disparity-amount correction are performed for each of the first to last rows, the present embodiment is not limited to the above way. For example, the processing direction may be changed so as to perform the processing sequentially for each of the first to last columns.

Though the above describes the example to compare contour information of two-dimensional-image signal 1000 and contour information of disparity-image signal 3000 and correct disparity-image signal 3000, the correction of disparity-image signal 3000 may be performed by comparing contour information of two-dimensional-image signal 1000 and contour information of depth-image signal 2000 with each other. In this case, as shown in FIG. 1B, disparity-image-correcting section 102 works as a depth-image-correcting section. Among the processes of disparity-image-generating section 101 and the depth-image-correcting section, correction of depth-image signal 2000 to be used for generating the disparity-image signal is performed at first. The correction is the same as the correcting way to compare contour information of two-dimensional-image signal 1000 and contour information of disparity-image signal 3000. The contour information of two-dimensional-image signal 1000 and the contour information of depth-image signal 2000 are compared with each other, and the depth value (depth information) of each pixel in the error area in depth-image signal 2000 are corrected. Thereby, the corrected depth-image signal 2001 is generated. Next, corrected disparity-image signal 3001 is generated and outputted by using the corrected depth-image signal 2001 and virtual-camera parameter 7000, for performing the correction of disparity-image signal 3000.

Though the present embodiment describes the case that two-dimensional-image signal 1000 and depth-image signal 2000 are inputted, the present embodiment does not limited to that. For example, this embodiment can be applied to the situation that signal of just one two-dimensional image 1000 is inputted. In this case, disparity-image signal and depth-image signal corresponding to pixels of the two-dimensional image may be estimated based on color information and brightness information of the two-dimensional-image signal as an input. In another case that signal of plural two-dimensional images is inputted, disparity-image signal and depth-image signal corresponding to signal of any one of the two-dimensional images may be estimated through a method such as a block matching method including SAD (Sum of Absolute Differences) and SSD (Sum of Squared Difference) and a matching method of SIFT (Scale-Invariant Feature Transform) feature points.

As described above, the present embodiment enables generation of virtual-viewpoint image with high image quality based on one of two-dimensional images for performing 3D display. Then, as shown in FIG. 14, three-dimensional display panel 10000 displays the two-dimensional-image signal 1000 as an input and the virtual-viewpoint-image signal 4002 outputted from the present image generation apparatus 100 and adjust the display so that the right eye and the left eye can perceive the images separately, which realizes a synthesized stereoscopic representation in an image display apparatus.

Embodiment 2

A structure of an image generation apparatus 200 relating to Embodiment 2 will be described with reference to FIG. 6. FIG. 6 is a block diagram illustrating a structure of an image generation apparatus 200 relating to the present embodiment.

As shown in FIG. 6, image generation apparatus 200 includes disparity-image-generating section 101, pixel-shift-processing section 103, unfixed-pixel-area-interpolating section 104 and noise-in-unfixed-pixel-area-eliminating section 105.

Image generation apparatus 200 generates virtual-viewpoint-image signal 4002 by using two-dimensional-image signal 1000 and depth-image signal 2000 with low accuracy, similarly to Embodiment 1, but performs elimination of noise in the area of unfixed pixels in place of the disparity-image correction described in Embodiment 1, to prevent the image quality of virtual-viewpoint-image signal 4002 from being deteriorated.

Hereinafter, a specific processing flow will be described with reference to FIG. 6. In the description, structural elements which are the same as those of FIGS. 1A and 1B will be referred by the same symbols to those of FIGS. 1A and 1B and their description will be omitted.

Disparity-image-generating section 101 generates disparity-image signal 3000 by using depth-image signal 2000 and virtual-camera parameter 7000 as inputs.

Pixel-shift-processing section 103 shifts each pixel of the two-dimensional-image signal to a proper position according to disparity-image signal 3000, to generate intermediate-image signal 4001. In order to record the positions of the unfixed pixels in intermediate-image signal 4001, a flag buffer whose initial value is 0 is prepared in pixel-shift-processing section 103. Corresponding to the shift processing for each pixel in intermediate-image signal, a value of a pixel in the flag buffer at the same coordinates as the position of each shifted pixel is changed from 0 to 1. Thereby, pixels whose pixel values remain zero in the flag buffer are considered to correspond to unfixed pixels in intermediate-image signal 4001.

Under the condition that disparity-image signal with high accuracy is inputted, disparity-image signal and two-dimensional-image signal perfectly correspond to each other, and a group of the disparity amounts of an object area and a group of the disparity amounts of a background area are clearly separated. When pixels corresponding to the object and pixels corresponding to the background are shifted according to the corresponding disparity amounts, there appears an area of unfixed pixels between the object area and the background area in the generated intermediate image. FIGS. 7A to 7C show an example of this condition. FIGS. 7A and 7B show inputted two-dimensional-image signal and inputted disparity-image signal, respectively. FIG. 7C shows outputted intermediate-image signal 4001. In FIG. 7A, pixel A represents a contour pixel of the object area and pixel B represents a contour pixel of the background area. Assuming that the corresponding disparity amount of the object area is $\Delta u1$ and the corresponding disparity amount of the background area is $\Delta u2$, contour pixel A' of the object area is given by shifting the pixel A in the two-dimensional-image signal by $\Delta u1$ in the horizontal direction and contour pixel B' of the background area is given by shifting the pixel B in the two-dimensional-image signal by $\Delta u2$ in the horizontal direction, in the generated intermediate-image signal shown in FIG. 7C. As shown in FIG. 7C, there is an area of unfixed-pixels at the border of the background area and the object area.

Because the inputted disparity-image signal 3000 has low accuracy as described above, an error area actually exists partially on the border of the object area and the background area in the disparity-image signal 3000, which makes pixels of the two-dimensional image corresponding to the error area, scattered in the area of unfixed pixels as noise in intermediate-image signal 4001 obtained according to disparity-image signal 3000. Therefore, the object looks as if its shape has been lost in the generated virtual-viewpoint-image signal because of the noise pixels.

FIGS. 8A to 8C show an example of this situation. FIG. 8A shows two-dimensional-image signal, FIG. 8B shows disparity-image signal with low accuracy and FIG. 8C shows generated intermediate-image signal. In FIG. 8A, a contour pixel of the object area is referred as A, a contour pixel of the background area is referred as B, and a neighboring pixel to the pixel B in the same background area as C. As shown in FIG. 8B, the disparity amount of pixel A is defined as $\Delta u1$. The pixel B is included in the error area of the disparity image and its disparity amount is defined as $\Delta ue$. The disparity amount of pixel C is defined as $\Delta u2$.

Based on FIG. 8B, all the pixels including pixels A, B and C are shifted and intermediate-image signal 4001 is generated as shown in FIG. 8C. In the intermediate-image signal 4001, contour pixel A of the object has been shifted to the position of A' and contour pixel C of the background has been shifted to the position of C'. However, the disparity amount of pixel B has an intermediate value between the disparity values of the object area and the background area, and pixels like the pixel B are scattered as noise pixels in the area of unfixed pixels. It can be considered that such the noise causes the deteriorated image quality of a virtual-viewpoint image.

To solve that, for the purpose to eliminate the noise, Embodiment 2 employs noise-in-unfixed-pixel-area-eliminating section 105. When intermediate-image signal 4001 is inputted into noise-in-unfixed-pixel-area-eliminating section 105, noise-in-unfixed-pixel-area-eliminating section 105 eliminates pixels which can be considered as noise in the area of unfixed pixels and outputs intermediate-image signal 4000 after the noise elimination.

Finally, intermediate-image signal 4000 after the noise elimination is inputted into unfixed-pixel-area-interpolating section 104. Unfixed-pixel-area-interpolating section 104 interpolates pixels of the unfixed-pixel area in intermediate-image signal 4000 by using the neighboring pixel similarly to Embodiment 1 and outputs virtual-viewpoint-image signal 4002.

Herein after, the structure of noise-in-unfixed-pixel-area-eliminating section 105, which is a primary part of the present embodiment, will be described with reference to FIG. 9. FIG. 9 illustrates a block diagram representing the structure of noise-in-unfixed-pixel-area-eliminating section 105.

As shown in FIG. 9, noise-in-unfixed-pixel-area-eliminating section 105 is composed of noise-judging section 105*a* and noise-eliminating section 105*b*. Noise-judging section 105*a* receives intermediate-image signal 4001 and flag-image signal 4003 which stores positions of areas of unfixed pixels in intermediate-image signal therein, judges noise pixels in the area of unfixed pixels, and outputs noise-pixel information 7001. Herein, noise-pixel information 7001 represents the positions of pixels judged as noise. Noise-eliminating section 105*b* receives noise-pixel information 7001 and intermediate-image signal 4001, eliminates noise pixels in intermediate-image signal 4001 according to noise-pixel information 7001, and outputs intermediate-image signal 4000 with noise eliminated.

FIGS. 10A and 10B show drawings for illustrating an example of a noise-judging algorithm. FIG. 10A shows flag-image signal 4003, wherein the white part and the black part correspond to an area of pixels whose values have been fixed in intermediate-image signal 4001 and an area of pixels whose values have not been fixed in the intermediate-image signal 4001, respectively. FIG. 10B shows an enlarged view of the part enclosed by the broken line in FIG. 10A. As shown in FIG. 10B, there is pixel area c with a length of x between the area of unfixed pixel e with a length of z and the area of unfixed pixel f with a length of y. In order to judge whether pixel area c corresponds to noise or not, the present embodiment employs noise-judging threshold β and compares the value of β and the length x of area c according to the expression (2).

$$\text{Pixel Area } c = \begin{cases} \text{Normal Pixel,} & x \geq \beta \\ \text{Noise,} & x < \beta \end{cases} \quad (2)$$

When the length x of pixel area c is smaller than the threshold β, pixel area c is judged as noise. In other cases, pixel area c is judged as a normal pixel area. Alternatively, it may be judged whether the pixel area c corresponds to noise or not, based on the ratio of the total length of areas of unfixed pixels e and f, and the length of pixel area c. The judging expression is given as the expression (3).

$$\text{Pixel Area } c = \begin{cases} \text{Noise,} & (z+y)/x > \beta \\ \text{Normal Pixel,} & (z+y)/x \leq \beta \end{cases} \quad (3)$$

As shown by the expression (3), when the ratio of the total length of areas of unfixed pixels e and f and the length of pixel area c is larger than the threshold β, pixel area c is judged as noise, and, otherwise, pixel area c is judged as a normal pixel area.

Though the above description described about the noise-elimination algorithm of the area of unfixed pixels with reference to FIGS. 9, 10A and 10B, the way of noise elimination employed in the embodiment of the present invention is not limited to that. The scope of the present invention also includes noise elimination performed by applying a two-dimensional smoothing filter to the area of unfixed pixels.

As described above, the present embodiment enables generation of virtual-viewpoint-image signal with less noise and high image quality even when an inputted depth-image signal with low accuracy or disparity-image signal is not corrected previously. Then, as shown in FIG. 14, three-dimensional display panel 10000 displays the two-dimensional-image signal 1000 as an input and the virtual-viewpoint-image signal 4002 outputted from the present image generation apparatus 100 and adjust the display so that the right eye and the left eye can perceive the images separately, which realizes a synthesized stereoscopic representation in an image display apparatus.

Embodiment 3

A structure of an image generation apparatus 300 relating to Embodiment 3 will be described with reference to FIG. 11. FIG. 11 is a block diagram illustrating a structure of an image generation apparatus 300 relating to the present embodiment. Structural elements which are the same as those of FIGS. 1A and 1B will be referred by the same symbols to those of FIGS. 1A and 1B and their description will be omitted.

As shown in FIG. 11, image generation apparatus 300 includes disparity-image-generating section 101', disparity-image-correcting section 102, pixel-shift-processing section 103 and unfixed-pixel-area-interpolating section 104, similarly to Embodiment 1. Though Embodiment 1 provides two-dimensional-image signal 1000, depth-image signal 2000 corresponding to the same and virtual-camera parameter 7000 as inputs, the present embodiment provides signal of plural two-dimensional images 1000 as the input.

As shown in FIG. 11, signal of plural two-dimensional images (frame number: 1 through m to n) is inputted into disparity-image-generating section 101'. Disparity-image-generating section 101' estimates disparity-image signal 3000 corresponding to a disparity value of each pixel of one image of the signal of plural two-dimensional images by using a block matching method including SAD (Sum of Absolute Differences) and SSD (Sum of Squared Difference) or a matching method of SIFT (Scale-Invariant Feature Transform) feature points. Then, the estimated disparity-image signal 3000 and the corresponding two-dimensional-image signal 1000 are processed through the same flow as Embodiment 1, to generate virtual-viewpoint-image signal 4002.

Alternatively, disparity-image-generating section 101' may be combined with image generation apparatus 200 relating to Embodiment 2, to form image generation apparatus 300'. FIG. 12 shows image generation apparatus 300' of this case. Signal of plural two-dimensional images is inputted into disparity-image-generating section 101', and disparity-image-generating section 101' estimates disparity-image signal 3000 corresponding to a disparity value of each pixel of one image of the signal of plural two-dimensional images by using the above-described matching methods. Then, the estimated disparity-image signal 3000 and the corresponding two-dimensional-image signal 1000 are processed through the same flow as Embodiment 2, to generate virtual-viewpoint-image signal 4002.

The present embodiment enables generation of virtual-viewpoint-image signal without inputting depth-image signal representing depth information, which further more enlarges applicability of the present invention because of the increased variety of input signal. Then, as shown in FIG. 14, 3D-display panel 10000 displays the two-dimensional-image signal as an input and the virtual-viewpoint-image signal outputted from the present image generation apparatus with being adjusted so that the right eye and the left eye perceive the images separately, which realizes a synthesized stereoscopic representation in an image display apparatus.

Though the above describes each of the embodiments as a hardware structure, the present invention is not limited to such the structures and can be realized by executing arbitrary processes through causing a CPU (Central Processing Unit) to execute a computer program. In this case, the computer program may be provided with being stored in a computer-readable storing medium or may be provided by being transmitted through the Internet or another communication medium.

When the image-generation processing relating to the present invention is realized by causing a CPU to executing a computer program, it is difficult to confirm there is an infringement or not on hardware. Therefore, the way to confirm the infringement will be described below.

In order to distinguish the image-generation process relating to the present invention from the other smoothing processes and the other weighted processes of a disparity image, a specified image for confirming an infringement, which includes, for example, an object with a zigzag contour as shown in FIGS. 13A and 13B, can be employed. FIG. 13A shows two-dimensional-image signal including a star-shaped object, prepared for confirming an infringement. FIG. 13B shows disparity-image signal corresponding to the two-dimensional-image signal of FIG. 13A, wherein the contour of the object partially includes an error area because of its low accuracy.

In the processing way of Embodiment 1, the contour line of the object in the disparity image is fit to the contour line of the object in the two-dimensional image mandatorily. Thereby, the object and the background are clearly separated in the generated intermediate-image signal 4000, and there is no noise in the area of unfixed pixels located at the border of the object and the background.

In the processing way of Embodiment 2, a disparity image with low accuracy is inputted into pixel-shift-processing section 103 as it is and pixel-shift-processing section 103 generates intermediate-image signal 4001 with noise in an area of unfixed pixels. Then, the intermediate-image signal 4001 is inputted into noise-in-unfixed-pixel-area-eliminating section 105, and noise-in-unfixed-pixel-area-eliminating section 105 generates intermediate-image signal 4000 after the elimination of noise in the area of unfixed pixels. In this case, there is no noise in the area of unfixed pixels located at the border of the object and the background, too.

As described above, the embodiments of the present invention provide the feature that there is no noise in an area of unfixed pixels in intermediate-image signal 4000 before the unfixed-pixel interpolating process. Further, there is no conspicuous linear noise in virtual-viewpoint-image signal 4002 generated based on such the intermediate-image signal 4000. Furthermore, the contour line is clear because the contour line has been corrected.

On the other hand, when a conventional method such as a smoothing method is applied to a disparity image including an object with a zigzag contour, it is difficult to match the processed disparity-image signal and two-dimensional-image signal to each other completely. Therefore, noise in the area of unfixed pixels in the generated intermediate-image signal is hardly eliminated, and noise remains in the virtual-viewpoint image outputted finally. Further, because the contour line of the depth data is not corrected in the conventional method, it can be confirmed that the contour line of the virtual-viewpoint image is not only blurred but also displaced from the two-dimensional image.

FIG. 13C shows intermediate-image signal generated based on a disparity image processed with a general-purpose smoothing process. FIG. 13D shows intermediate-image signal generated by the processing way of Embodiment 1. FIG. 13E shows intermediate-image signal generated by the processing way of Embodiment 2. Comparing the three with each other, it can be confirmed that the areas of unfixed pixels in the intermediate-image signal shown in FIGS. 13E and 13D include almost no noise but the area of unfixed pixels in the intermediate-image signal shown in FIG. 13C includes the significant amount of noise.

When intermediate-image signal 4000 is not available for confirming an infringement, the infringement can be confirmed based on a virtual-viewpoint-image signal outputted finally. The embodiments of the present invention provide the feature that a contour area of each object includes almost no noise in virtual-viewpoint-image signal 4002 generated based on the intermediate-image signal. FIG. 13F shows virtual-viewpoint-image signal generated based on a disparity image processed by a general-purpose smoothing process. FIG. 13G shows virtual-viewpoint-image signal generated by the processing way of Embodiment 1. FIG. 13H shows virtual-viewpoint-image signal generated by the processing way of Embodiment 2. Comparing the three with each other, it can be confirmed that the contour area of the object in the virtual-viewpoint-image signal shown in FIGS. 13G and 13H include almost no noise but the contour area of the object in the virtual-viewpoint-image signal shown in FIG. 13F includes the significant amount of noise.

As described above, when an image including an object with a zigzag contour line is inputted into an image generation system, the confirmations whether the method relating to the present invention is used or not can be judged by comparing the degree of noise in the intermediate-image signal. Even under the situation that the intermediate-image signal is not available, when there is no linear noise in a generated virtual-viewpoint image, it can be judged that there is a high probability that the method relating to the present invention has been used to generate the virtual-viewpoint image.

While the present embodiments of the present invention have been described using specific terms, such description is for illustrative purpose only, and it is to be understood that changes and variations may be made without depending from the spirit or scope of the appended claims.

The present invention is applicable to an image generation apparatus, image display apparatus, image generation method and non-transitory computer readable medium, each providing a function to generate contents for performing 3D-display.

The invention claimed is:

1. An image generation apparatus which uses a two-dimensional image, a depth image representing depth information of the two-dimensional image, and a parameter of a virtual camera arranged at a virtual location in a three-dimensional space, to generate a virtual-viewpoint image to be captured with the virtual camera at the virtual location, the image generation apparatus comprising:
   a disparity-image-generating section which generates a disparity image representing a disparity value of each pixel of the two-dimensional image, by using the depth image and the parameter of the virtual camera;
   a disparity-image-correcting section which performs one of
      extracting a contour line from the two-dimensional image and a contour line from the disparity image, estimating an error area out of the disparity image generated by the disparity-image-generating section based on the extracted contour lines and correcting the disparity value of each of pixels in the error area, and
      extracting a contour line from the two-dimensional image and a contour line from the depth image, estimating an error area out of the depth image based on the extracted contour lines, correcting the depth information of each of pixels in the error area and correcting the disparity image generated by the disparity-image-generating section based on the corrected depth image;
   an pixel-shift-processing section which shifts each pixel of the two-dimensional image according to the disparity image which has been corrected, to generate an intermediate image; and
   a unfixed-pixel-area-interpolating section which interpolates unfixed pixels to which shifted pixels of the two-dimensional image have not been assigned in the intermediate image, to generate the virtual-viewpoint image.

2. The image generation apparatus of claim 1,
wherein the disparity-image-correcting section, for estimating the error area,
   defines a pixel of the contour line of the two-dimensional image as a reference pixel, the pixel being located on a predetermined one of lines which are one of rows and columns,
   determines two pixels of the contour line of the disparity image such that the two pixels are separated in a positive direction and a negative direction along the other of the rows and columns at a maximum distance within an area including lines which are the one of rows and columns in a vicinity of the predetermined one of lines, and
   estimates an area located between the two pixels and extending along the other of rows and columns as the error area.

3. The image generation apparatus of claim 1,
wherein the disparity-image-correcting section, for estimating the error area,
   defines a pixel of the contour line of the two-dimensional image as a reference pixel, the pixel being located on a predetermined one of lines which are one of rows and columns,
   determines two pixels of the contour line of the depth image such that the two pixels are separated in a positive direction and a negative direction along the other of the rows and columns at a maximum distance within an area including lines which are the one of rows and columns in a vicinity of the predetermined one of lines, and
   estimates an area located between the two pixels and extending along the other of rows and columns as the error area.

4. An image generation apparatus which uses a plurality of two-dimensional images to generate a virtual-viewpoint image to be captured with a virtual camera arranged at a virtual location in a three-dimensional space, the image generation apparatus comprising:
   a disparity-image-generating section which generates a disparity image representing a disparity value of each pixel of one of the plurality of two-dimensional image, by using the plurality of two-dimensional images;
   a disparity-image-correcting section which extracts a contour line from the one of the two-dimensional images and a contour line from the disparity image, estimates an error area out of the disparity image generated by the disparity-image-generating section based on the extracted contour lines and corrects the disparity value of each of pixels in the error area;
   a pixel-shift-processing section which shifts each pixel in the one of the plurality of two-dimensional images according to the disparity image which has been corrected, to generate an intermediate image; and
   a unfixed-pixel-area-interpolating section which interpolates unfixed pixels to which shifted pixels of the one of the two-dimensional image have not been assigned in the intermediate image, to generate the virtual-viewpoint image.

5. The image generation apparatus of claim 4,
wherein the disparity-image-correcting section, for estimating the error area,
   defines a pixel of the contour line of the one of the two-dimensional images as a reference pixel, the pixel being located on a predetermined one of lines which are one of rows and columns,
   determines two pixels of the contour line of the disparity image such that the two pixels are separated in a positive direction and a negative direction along the other of the rows and columns at a maximum distance within an area including lines which are the one of rows and columns in a vicinity of the predetermined one of lines, and
   estimates an area located between the two pixels and extending along the other of rows and columns as the error area.

6. An image generation apparatus which uses a two-dimensional image, a depth image representing depth information of the two-dimensional image, and a parameter of a virtual camera arranged at a virtual location in a three-dimensional space, to generate a virtual-viewpoint image to be captured with the virtual camera at the virtual location, the image generation apparatus comprising:
   a disparity-image-generating section which generates a disparity image representing a disparity value of each pixel of the two-dimensional image, by using the depth image and the parameter of the virtual camera;
   a pixel-shift-processing section which shifts each pixel of the two-dimensional image according to the disparity image, to generate an intermediate image;
   a noise-in-unfixed-pixel-area-eliminating section which eliminates noise in an area of unfixed pixels to which shifted pixels of the two-dimensional image have not been assigned in the intermediate image; and a unfixed-pixel-area-interpolating section which interpolates the unfixed pixels in the intermediate image wherein the noise has been eliminated, to generate the virtual-viewpoint image.

7. The image generation apparatus of claim 6, wherein the noise-in-unfixed-pixel-area-eliminating section comprises
a noise-judging section which compares a length of a pixel area located between two areas of unfixed pixels and a predetermined threshold for judging noise, to judge whether the pixel area corresponds to noise or not, and
a noise-eliminating section which performs a noise elimination in the pixel area when the pixel area is judged as noise.

8. The image generation apparatus of claim 6, wherein the noise-in-unfixed-pixel-area-eliminating section comprises
a noise-judging section which compares a ratio of a total length of two areas of unfixed pixels to a length of a pixel area located between the two areas of unfixed pixels, and a predetermined threshold for judging noise, to judge whether the pixel area corresponds to noise or not, and
a noise-eliminating section which performs a noise elimination in the pixel area when the pixel area is judged as noise.

9. An image generation apparatus which uses a plurality of two-dimensional images to generate a virtual-viewpoint image to be captured with a virtual camera arranged at a virtual location in a three-dimensional space, the image generation apparatus comprising:
a disparity-image-generating section which generates a disparity image representing a disparity value of each pixel of one of the plurality of two-dimensional image, by using the plurality of two-dimensional images;
a pixel-shift-processing section which shifts each pixel in the one of the plurality of two-dimensional images according to the disparity image, to generate an intermediate image;
a noise-in-unfixed-pixel-area-eliminating section which eliminates noise in an area of unfixed pixels to which shifted pixels of the one of the two-dimensional images have not been assigned in the intermediate image; and
a unfixed-pixel-area-interpolating section which interpolates the unfixed pixels in the intermediate image wherein the noise has been eliminated, to generate the virtual-viewpoint image.

10. The image generation apparatus of claim 9, wherein the noise-in-unfixed-pixel-area-eliminating section comprises
a noise-judging section which compares a length of a pixel area located between two areas of unfixed pixels and a predetermined threshold for judging noise, to judge whether the pixel area corresponds to noise or not, and
a noise-eliminating section which performs a noise elimination in the pixel area when the pixel area is judged as noise.

11. The image generation apparatus of claim 9, wherein the noise-in-unfixed-pixel-area-eliminating section comprises
a noise-judging section which compares a ratio of a total length of two areas of unfixed pixels to a length of a pixel area located between the two areas of unfixed pixels, and a predetermined threshold for judging noise, to judge whether the pixel area corresponds to noise or not, and
a noise-eliminating section which performs a noise elimination in the pixel area when the pixel area is judged as noise.

12. A three-dimensional image display apparatus comprising the image generation apparatus of claim 1 and a stereoscopic display panel.

13. An image generation method which uses a two-dimensional image, a depth image representing depth information of the two-dimensional image, and a parameter of a virtual camera arranged at a virtual location in a three-dimensional space, to generate a virtual-viewpoint image to be captured with the virtual camera at the virtual location, the image generation method comprising:
a disparity-image-generating step of generating a disparity image representing a disparity value of each pixel of the two-dimensional image, by using the depth image and the parameter of the virtual camera;
a disparity-image-correcting step of performing one of
extracting a contour line from the two-dimensional image and a contour line from the disparity image, estimating an error area out of the disparity image generated in the disparity-image-generating step based on the extracted contour lines and correcting the disparity value of each of pixels in the error area, and
extracting a contour line from the two-dimensional image and a contour line from the depth image, estimating an error area out of the depth image based on the extracted contour lines, correcting the depth information of each of pixels in the error area and correcting the disparity image generated in the disparity-image-generating step based on the corrected depth image;
an pixel-shift-processing step of shifting each pixel of the two-dimensional image according to the disparity image which has been corrected, to generate an intermediate image; and
a unfixed-pixel-interpolating step of interpolating unfixed pixels to which shifted pixels of the two-dimensional image have not been assigned in the intermediate image, to generate the virtual-viewpoint image.

14. A non-transitory computer readable medium storing an image generation program for use in an apparatus which uses a two-dimensional image, a depth image representing depth information of the two-dimensional image, and a parameter of a virtual camera arranged at a virtual location in a three-dimensional space, to generate a virtual-viewpoint image to be obtained when an object is captured with the virtual camera at the virtual location, the image generation program causing the apparatus to execute processing comprising:
a disparity-image-generating step of generating a disparity image representing a disparity value of each pixel of the two-dimensional image, by using the depth image and the parameter of the virtual camera;
a disparity-image-correcting step of performing one of
extracting a contour line from the two-dimensional image and a contour line from the disparity image, estimating an error area out of the disparity image generated by the disparity-image-generating section based on the extracted contour lines and correcting the disparity value of each of pixels in the error area, and
extracting a contour line from the two-dimensional image and a contour line from the depth image, estimating an error area out of the depth image based on the extracted contour lines, correcting the depth information of each of pixels in the error area and correcting the disparity image generated by the disparity-image-generating section based on the corrected depth image;

an pixel-shift-processing step of shifting each pixel of the two-dimensional image according to the disparity image which has been corrected, to generate an intermediate image; and a unfixed-pixel-interpolating step of interpolating unfixed pixels to which shifted pixels of the two-dimensional image have not been assigned in the intermediate image, to generate the virtual-viewpoint image.

* * * * *